United States Patent [19]
Grutzik

[11] Patent Number: 5,899,474
[45] Date of Patent: May 4, 1999

[54] FREQUENCY-ACCELERATED VELOCIPEDE

[76] Inventor: Joe Grutzik, 3200 S. Barrington, Ave., Apt. J., Los Angeles, Calif. 90066

[21] Appl. No.: 08/679,508

[22] Filed: Jul. 12, 1996

[51] Int. Cl.$^6$ ....................................................... B62M 1/00
[52] U.S. Cl. ........................ 280/229; 280/87.041; 305/6.9
[58] Field of Search ..................................... 280/220, 221, 280/229, 87.021, 87.041, 87.042, 87.043, 47.1; 305/6.9, 110.5

[56] References Cited

U.S. PATENT DOCUMENTS

| | | | |
|---|---|---|---|
| D. 148,848 | 3/1948 | Gezari | 280/87.041 |
| 499,009 | 6/1893 | Bunker | 280/229 |
| 605,182 | 6/1898 | Johnston | 280/229 |
| 883,746 | 4/1908 | Robbins | 280/229 |
| 1,364,471 | 1/1921 | Ameli | 280/221 |
| 1,425,880 | 8/1922 | Mack | 280/87.041 |
| 1,514,720 | 11/1924 | Pauly | 280/87.041 X |
| 1,566,487 | 12/1925 | Letin | 280/87.041 X |
| 1,568,412 | 1/1926 | Parkes | 280/87.041 |
| 1,617,357 | 2/1927 | Walter | 280/221 |
| 1,655,353 | 1/1928 | Barei | 280/221 |
| 1,664,864 | 4/1928 | Rutherford | 280/229 |
| 1,679,819 | 8/1928 | Fageol | 280/229 |
| 1,684,298 | 9/1928 | Cash | 280/221 |
| 1,705,540 | 3/1929 | Rumley | 280/229 |
| 1,733,952 | 10/1929 | Engesser | 280/229 |
| 1,910,527 | 5/1933 | Dormoy | 188/18 R |
| 2,013,843 | 9/1935 | Schwedhelm | 280/267 |
| 2,086,471 | 7/1937 | Chapman | 280/229 |
| 2,125,568 | 8/1938 | Huyssen et al. | 280/229 |
| 2,815,222 | 12/1957 | Harrison | 280/261 |
| 3,052,481 | 9/1962 | Kaufman | 280/87.041 X |
| 3,086,795 | 4/1963 | Hatcher et al. | 280/229 |
| 3,152,813 | 10/1964 | Brown | 280/229 |
| 3,292,946 | 12/1966 | Melson | 280/229 |
| 3,336,046 | 8/1967 | Seiling | 280/229 |
| 3,371,944 | 3/1968 | Daniels | 280/229 |
| 3,455,415 | 7/1969 | De Pew | 188/17 |
| 3,647,241 | 3/1972 | Huyssen | 280/229 |
| 3,717,361 | 2/1973 | Vanderpool | 280/229 |
| 3,770,295 | 11/1973 | Sword | 280/229 |
| 3,799,581 | 3/1974 | Munn | 280/229 |
| 3,831,977 | 8/1974 | Osborne et al. | 280/229 |
| 4,162,084 | 7/1979 | Mikina | 280/229 |
| 4,201,396 | 5/1980 | Gessi | 280/229 |
| 4,602,822 | 7/1986 | Kim et al. | 301/110.5 |
| 4,669,746 | 6/1987 | Wu | 280/229 |
| 4,755,005 | 7/1988 | Tsai | 301/110.5 |
| 4,917,394 | 4/1990 | Lin | 280/229 |
| 5,249,847 | 10/1993 | Lee | 280/229 |
| 5,470,089 | 11/1995 | Whitson et al. | 280/87.041 |
| 5,553,878 | 9/1996 | Davignon et al. | 280/229 |
| 5,620,189 | 4/1997 | Hinderhofer | 280/87.041 X |

*Primary Examiner*—Kevin Hurley
*Attorney, Agent, or Firm*—Pillsbury Madison & Sutro LLP

[57] ABSTRACT

The present invention provides a rider-propelled vehicle that includes a frame capable of supporting a rider, an eccentrically-mounted front wheel, and a concentrically-mounted rear wheel. In one embodiment, the rider propels the vehicle using the cyclic motion of the eccentric front wheel, and a driving mechanism is not provided for the rear wheel. Another embodiment of the present invention provides a frame for a rider-propelled vehicle. The frame includes a head tube, a top tube connected to the head tube and extending to one side of an axle for a rear wheel, a bottom tube connected to the head tube below the top tube and extending to another side of the axle for the rear wheel, and a cross tube extending between the top tube and bottom tube in front of the rear wheel. In this embodiment, the top tube and the bottom tube extend along side one another at the same height from the location for connecting the axle for the rear wheel to a predetermined location. This portion of the top and bottom tubes allows for connection with a deck capable of accommodating a rider.

6 Claims, 9 Drawing Sheets

FREQUENCY-ACCELERATED VELOCIPEDE

FIELD OF THE INVENTION

The present invention relates to a velocipede, and more specifically to a two-wheel velocipede capable of accommodating a standing rider, wherein the rider weights and unweights his body mass in order to accelerate the rotation of an eccentrically mounted front wheel and propel the device forward.

BACKGROUND OF THE INVENTION

A first example of a conventional velocipede having an eccentrically mounted wheel is disclosed in U.S. Pat. No. 3,799,581. The disclosed vehicle includes a front-mounted eccentric wheel and a rear-mounted normal (or concentric) wheel. A rider uses a chain driving mechanism to rotate the concentric rear wheel and propel the vehicle forward. The eccentric front wheel is provided to induce a peculiar motion to the vehicle as it is ridden, but is not used for driving the vehicle. In such a vehicle, the primary source of propulsion is foot-driven pedals as with a conventional bicycle. The rider does not propel the vehicle using the cyclic movement of the eccentric wheel and does not use his arms and torso in driving the vehicle.

A second example of a conventional velocipede having an eccentrically mounted wheel is disclosed in U.S. Pat. No. 4,669,746. The disclosed vehicle includes a front-mounted concentric wheel and a rear-mounted eccentric wheel. A rider uses the eccentric motion of the rear wheel as the primary means for propelling the vehicle forward. The concentric front wheel is not used for driving the vehicle. This type of vehicle suffers from the drawback that the rider does not have forward visual access to the driving wheel's eccentric movement. The rear-mounted eccentric wheel also fails to transfer the full motion of the eccentricity to both the handlebars and deck of the velocipede.

SUMMARY OF THE INVENTION

In view of these problems, it is an object of the present invention to provide a medium-distance, rider-propelled vehicle that is interesting, challenging, and efficient.

It is another object of the present invention to provide a velocipede that has a relatively large, eccentric wheel mounted in the front to allow the rider immediate visual access to the driving wheel's eccentric movement. With this visual reference, the rider can quickly assimilate the full motion of the velocipede's eccentric oscillating movement. Additionally, the front-mounted eccentric wheel transfers the full motion of the eccentricity to the handlebars of the velocipede. This induces a rider to contribute energy from his legs, arms, and torso, and thus provides the rider with a full-body aerobic workout.

Another object of the present invention is to provide a velocipede that incorporates a smaller back wheel that makes the device more compact. A compact velocipede takes up less space in, for example, a car trunk or storage area. The smaller back wheel also makes the velocipede lighter so that it can be more efficiently operated. In other words, if the velocipede weighs less, less effort is required for the rider to perpetuate the kinetic energy needed to propel the device. Additionally, a smaller back wheel makes the device less cumbersome, and thus easier to carry. The more compact, less cumbersome, and light-weight velocipede is highly portable and can be easily transferred (e.g., between the storage area, the car, and a riding area).

Yet another object of the present invention is to provide a velocipede with an improved frame geometry that can support a standing rider on a device having a large, eccentric front driving wheel and a smaller back wheel. The improved frame geometry connects a vertical head tube with a horizontal rear wheel axle, while aligning the center of gravity of the rider primarily over the (eccentric) driving wheel. This alignment of the center of gravity with the axis of the driving wheel provides a large moment arm of which the rider can take advantage to more easily and efficiently propel the velocipede. Additionally, the improved frame geometry makes the device very sturdy. The frame's four main tubes (i.e., head tube, top tube, bottom tube, and cross tube) form a closed toroid force loop that evenly distributes forces over the entire frame. This, in turn, allows the device to be manufactured using lighter and less expensive materials. Further, the improved frame geometry contains very few elements so the weight of the device and the manufacturing costs are lowered.

Another object of the present invention is to provide a velocipede that is built with very few moving parts so that the manufacturing and assembly costs for the device can be minimized. Limiting the number of moving parts also reduces maintenance costs because there are fewer moving parts to wear out.

Still another object of the present invention is to provide a device with a one-piece front fork, handlebar, and headset unit, which is herein referred to as the "handleforks". The handleforks combine the front forks, handlebars, neck, and headset of bearings, tubes, and linkages into one integral part. Thus, the handleforks can replace the handlebars, neck, front forks, and headset assembly of a conventional bicycle with a single part to further reduce the manufacturing and assembly costs for the device.

According to one embodiment of the present invention, a rider-propelled vehicle is provided that includes a frame capable of supporting a rider, a front wheel that is eccentrically mounted to the frame through fork means, and a rear wheel that is concentrically mounted to the frame. In this embodiment of the present invention, the rider propels the vehicle using the cyclic motion of the eccentric front wheel, and driving means is not provided for the rear wheel.

According to another embodiment of the present invention, a frame is provided for a rider-propelled vehicle having a rear wheel and a front wheel connected to the frame using fork means. The frame includes a head tube for interfacing with the fork means so that the fork means and front wheel can be partially rotated for steering the vehicle, a top tube connected to the head tube and extending to one side of an axle for the rear wheel, a bottom tube connected to the head tube below the top tube, the bottom tube extending to another side of the axle for the rear wheel, and a cross tube extending between the top tube and bottom tube in front of the rear wheel. In this embodiment of the present invention, either the front wheel or the rear wheel is eccentrically-mounted, and the top tube and the bottom tube extend along side one another at the same height from the location for connecting the axle for the rear wheel to a predetermined location between the cross tube and a rear edge of the front wheel. This portion of the top and bottom tubes allows for connection with a deck capable of accommodating a rider.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the gist of the present invention.

DETAILED DESCRIPTION OF THE PREFERRED EMBODIMENTS

Preferred embodiments of the present invention will be described in detail hereinbelow with reference to the attached drawings.

Figure 1:
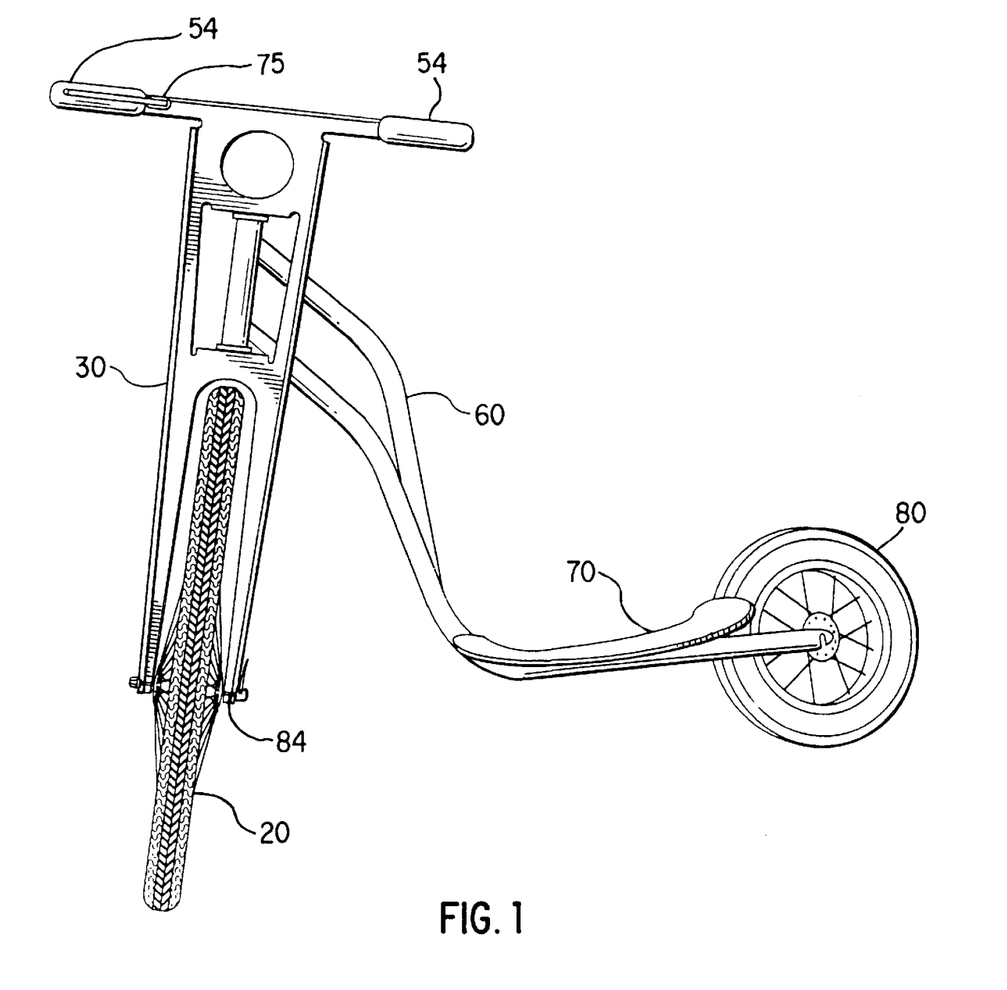
FIG. 1 is a perspective view of a first embodiment of the present invention.

FIG. 1 shows a perspective view of a first embodiment of the present invention. The first embodiment of the frequency-accelerated velocipede of the present invention includes a velocipede frame 60, front handleforks 30, a large eccentric front wheel 20, and a smaller back wheel 80. A deck 70, illustratively made from plastic, is mounted on the horizontal portion of the frame in front of the back wheel. The handles of the handleforks 30 are provided with grips 54 and one of the handles includes a braking control 75. During operation, a rider first places one foot on the deck 70 and the other foot on the ground. To initially propel the velocipede, the rider pushes with his ground foot just as with a conventional scooter. Then when a sufficient speed is achieved, the rider can place both feet on the deck 70 and continue to propel the velocipede by taking advantage of the motion of the eccentric front wheel 20, as is explained below in detail.

Figure 2:
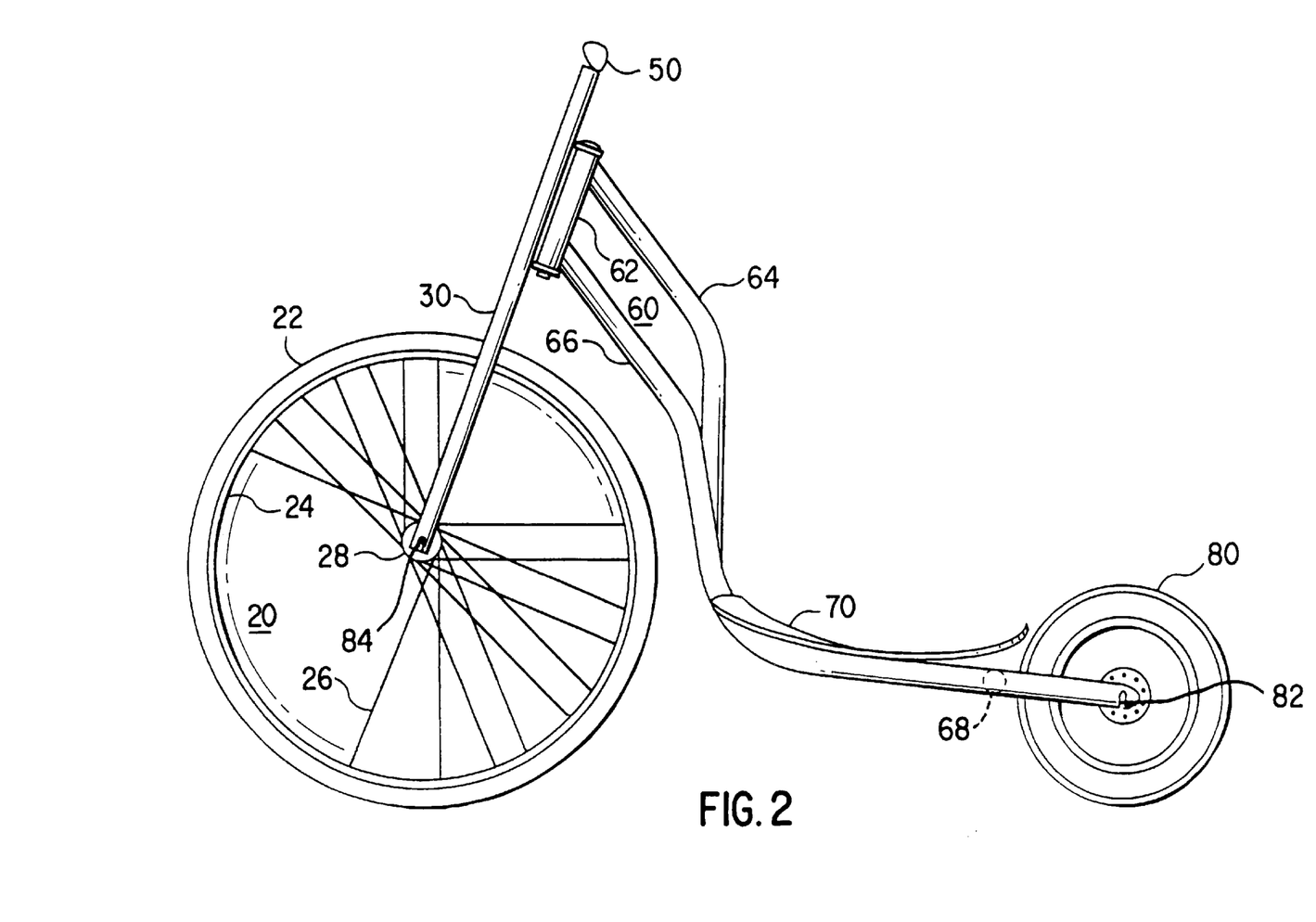
FIG. 2 is a side view of the first embodiment of the present invention showing the front wheel in a first rotational position.

FIG. 2 shows a side view of the embodiment of the velocipede shown in FIG. 1. The velocipede frame 60 is formed by four separate metal tubes: the head tube 62, the top tube 64, the bottom tube 66, and the cross tube 68 (shown in phantom). The frame 60 is joined with the handleforks 30 such that the handlefork assembly is rotatively joined through the head tube 62. More specifically, the head tube 62 is a hollow cylindrical receiving sleeve for the handleforks 30. In further embodiments, the frame 60 is joined with a conventional front fork and handlebar assembly through the head tube. In preferred embodiments, the head tube 62 is set forward at an angle to facilitate a castor effect. The head tube 62 is rigidly connected to both the top tube 64 and the bottom tube 66.

The top tube 64 extends down, back, and to the right (relative to a forward facing rider) in one continuous rigid shape to one side of the rear axle 82. In a preferred embodiment, the top tube 64 is fish mouth cut and welded to the head tube 62 and has the following shape. From the head tube 62 the upper portion of the top tube 64 continues back and down eleven inches at an angle of 38 degrees. Next, the top tube 64 has a center portion that extends down at an angle of ninety degrees for six and seven-sixteenths inches. Then, the lower portion of the top tube 64 turns back ninety degrees to run parallel to the ground for seventeen and five thirty-seconds inches. One side of the rear axle 82 is connected to the top tube 64 in the vicinity of the end of its lower portion.

Similarly, the bottom tube 66 is formed down, back, and to the left in one continuous rigid shape to the other side of the rear axle 82. The bottom tube 66 and the top tube 64 support the deck 70. In a preferred embodiment, the bottom tube 66 is fish mouth cut, is welded to the head tube 62 three inches below the top tube 64, and has the following shape. From the head tube 62, the upper portion of the bottom tube 66 continues back and down ten and seven-sixteenths inches at an angle of 38 degrees. Then, the center portion of the bottom tube 66 turns down to an angle of eighty degrees and extends for seven inches. Next, the lower portion of the bottom tube 66 turns back eighty degrees to run parallel to the ground for seventeen and five thirty-seconds inches. The other side of the rear axle 82 is connected to the bottom tube 66 in the vicinity of the end of its lower portion.

Figure 8:
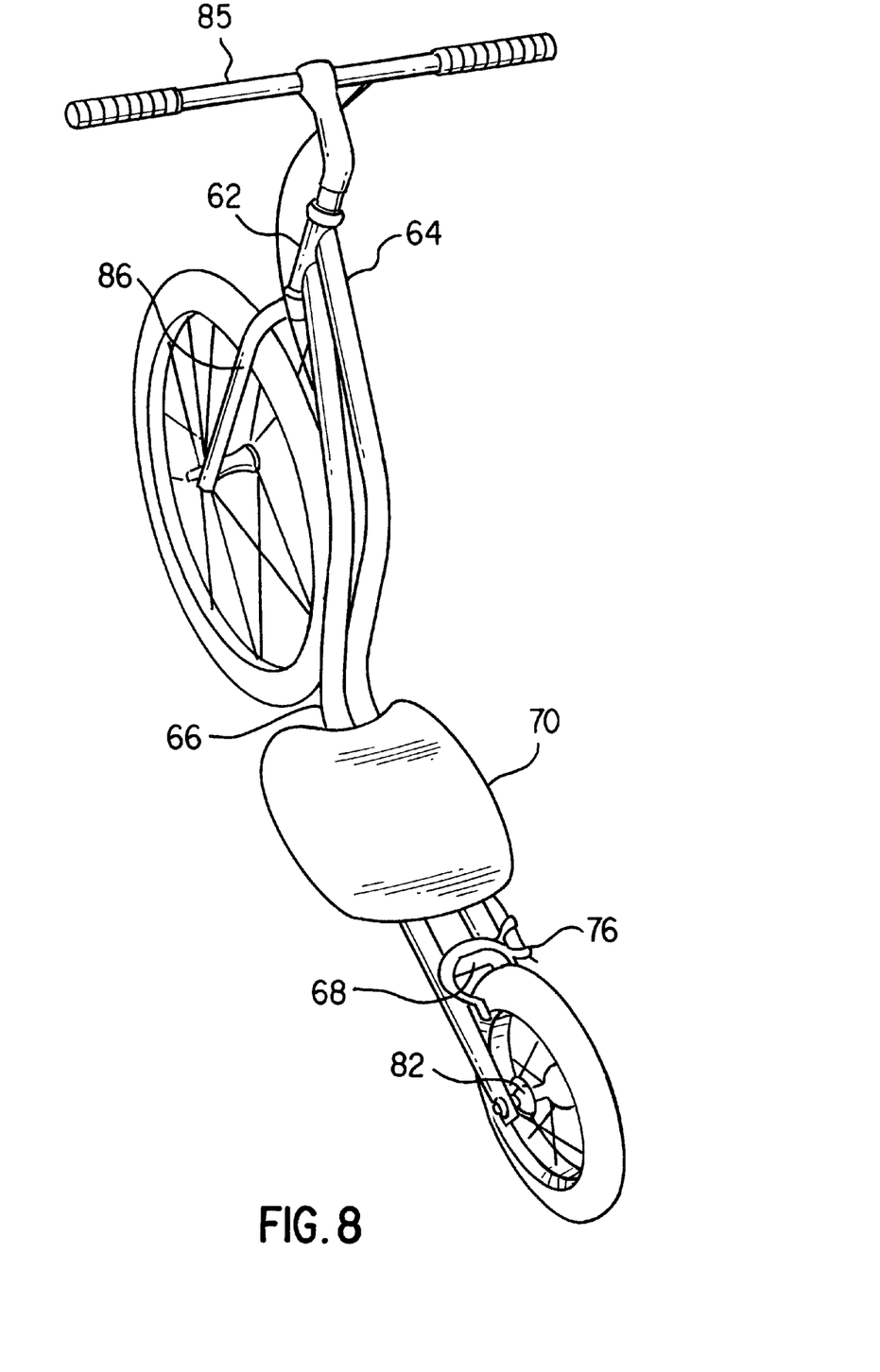
FIG. 8 is a rear perspective view of a second embodiment of the present invention.

In the first embodiment, all of the bends in the top tube 64 and the bottom tube 66 are made in the same plane. As shown in FIG. 8, from the back, the top tube 64 is angled out at an angle of four and one-half degrees and the bottom tube 66 is angled out at an angle of five degrees. The cross tube 68, which is preferably two and one quarter inches long and is fish mouth cut at both ends, is welded between the top tube 64 and the bottom tube 66. The cross tube 68 extends parallel to the ground and is located seven and one half inches from the back wheel axle 82. A brake assembly 76 is supported by the cross tube. The deck 70 is firmly fastened atop the top tube 64 and the bottom tube 66 just ahead of the cross tube 68 to act as the main support for the rider.

Figure 6:
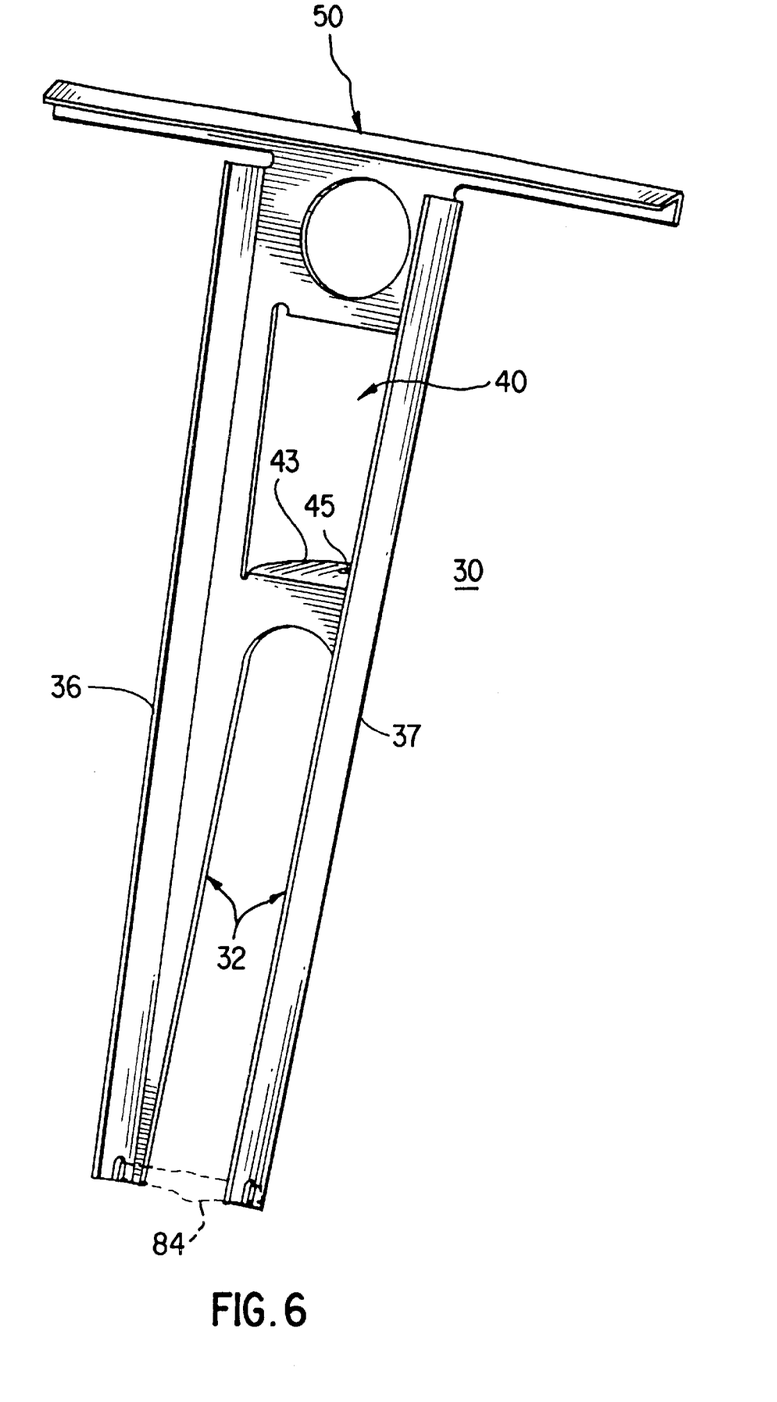
FIG. 6 is a view of the handleforks of the first embodiment of the present invention.

FIG. 6 shows a view of the handleforks of the first embodiment of the present invention. The handleforks 30 integrate all of the features of the head set, handlebars, and front forks of a conventional bicycle into a single unit. As shown in FIG. 6, the rider's handholds are the handlebars 50 of the handleforks. As with conventional bicycle handlebars, the handlebars 50 of the handleforks are held and manipulated by the rider for steering and control. In a preferred embodiment, the handleforks are formed of a single piece of sheet metal. The sheet metal is bent forward and away from the rider to create the handlebar stiffening flange. This flange extends across the top edge of the handlebars 50 and is covered at both ends by handlebar grips 54 (FIG. 1). In the center portion of the handleforks 30, there is formed a slot 40 for receiving the head tube. Two front wheel forks 32 extend from the center portion of the handleforks 30. The forks 32 are similar to the front forks of a conventional bicycle. The front axle 84 is rotatably connected to the front forks 32 at the lower ends of the right fork stiffening flange 36 and the left fork stiffening flange 37.

Figure 7:
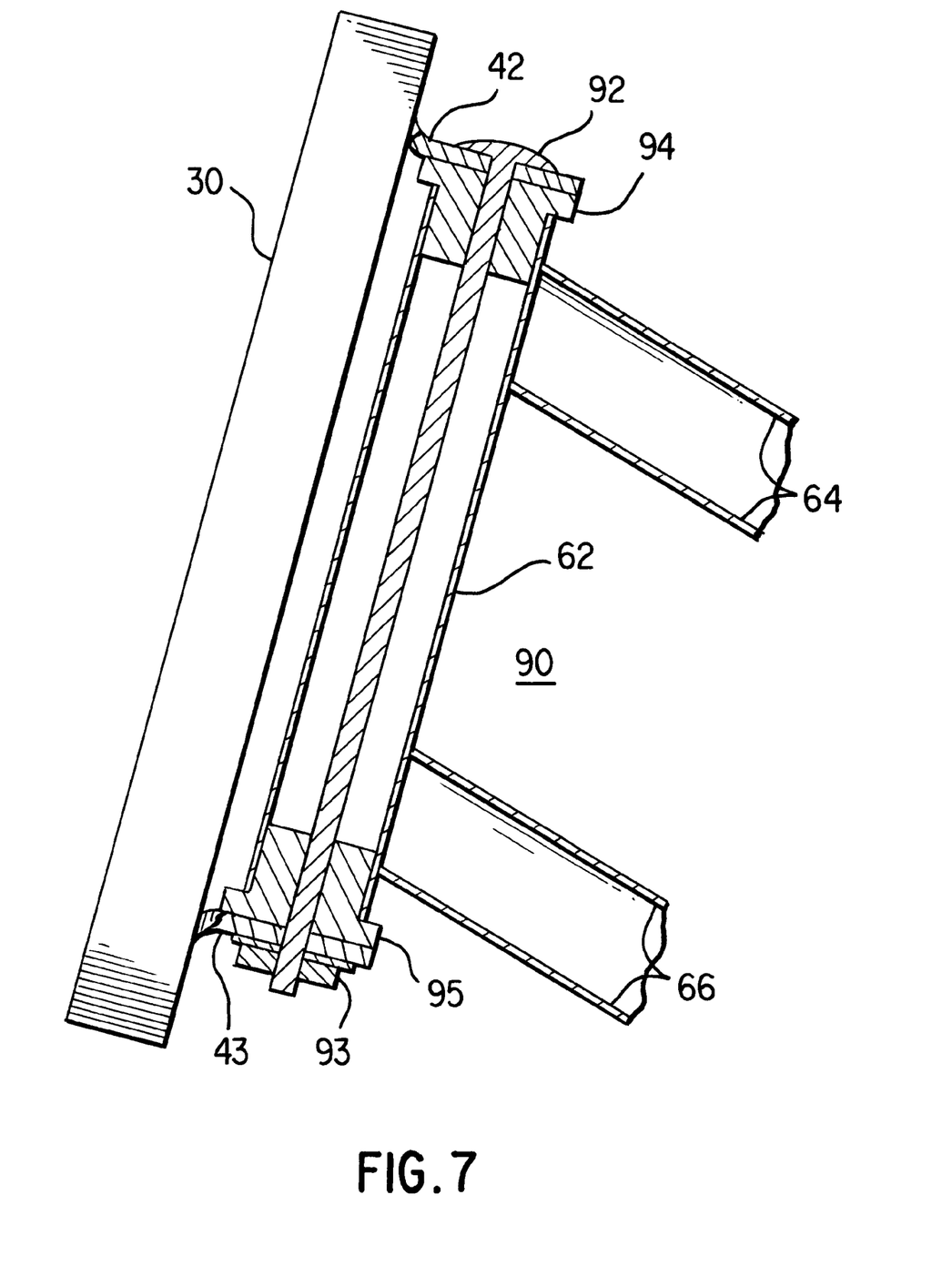
FIG. 7 is a sectional view of the headset assembly of the first embodiment of the present invention.

FIG. 7 shows a sectional view of the headset assembly of the first embodiment of the present invention. In the headset assembly 90, the head tube 62 is held axially in position between the upper 42 and lower 43 head tube flanges of the handleforks by a headset bolt 92 and nut 93. The handleforks are attached to the frame so that they can rotate freely through a large angle for steering the velocipede. The upper headset bearing 94 and the lower headset bearing 95 conduct the bearing loads from the velocipede frame 60 to the handleforks 30.

Figure 9:
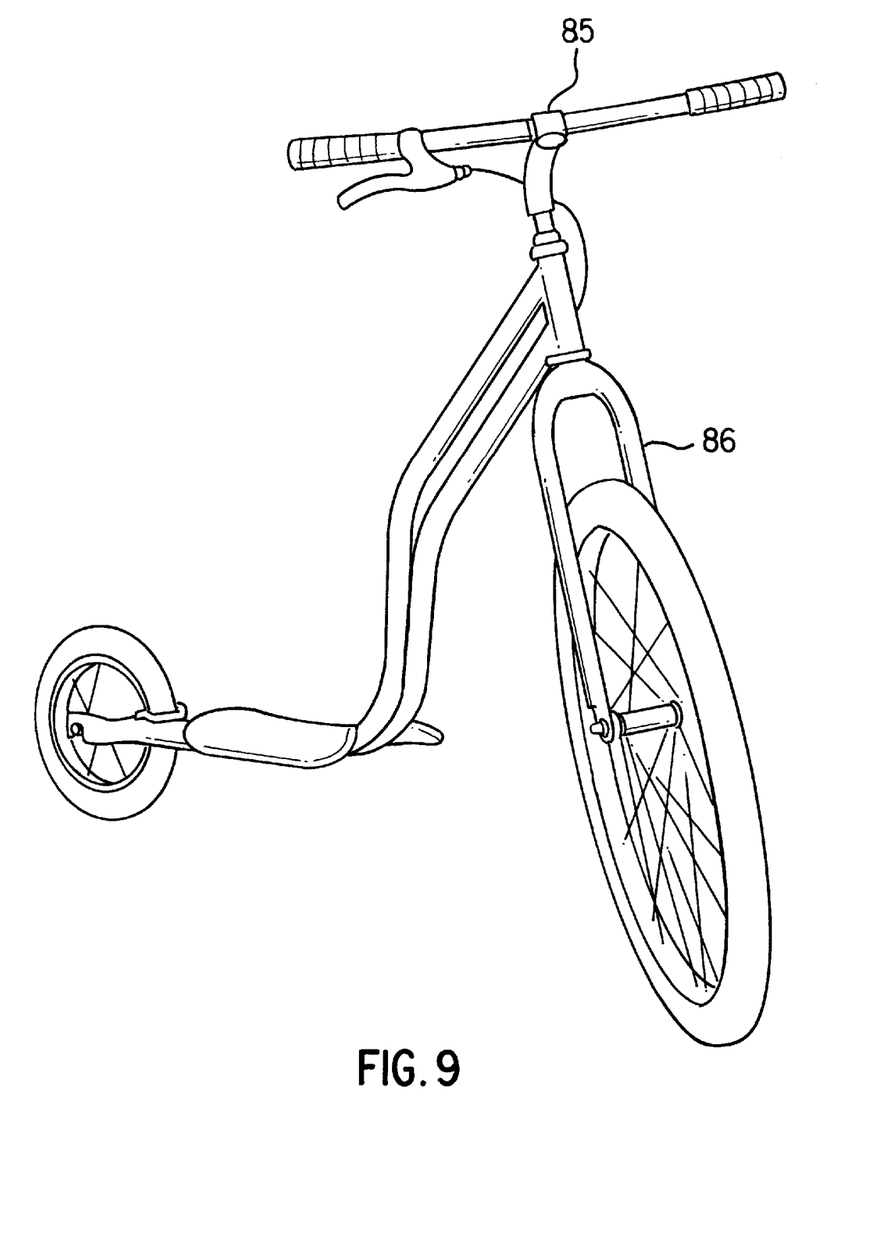
FIG. 9 is a front perspective view of the second embodiment of the present invention.

In a second embodiment of the present invention, the handleforks are replaced by a conventional handlebar and fork assembly. As shown in FIGS. 8 and 9, the second embodiment includes separate handlebars 85 and forks 86 connected to the frame through the head tube 62 in a conventional manner.

FIGS. 2–5 show the eccentric front wheel of the velocipede in different rotational positions. The wheel includes a front tire 22, a front rim 24, front spokes 26, and a front hub 28. The front hub 28 is eccentrically mounted in the front wheel 20 using a series of front spokes 26 of different lengths. As with a conventional bicycle, the front axle 84 extends through the front hub to connect the front wheel to the handleforks. The smaller back wheel 80 is a conventional wheel having a tire, spokes, an axle and axle hardware. The rear axle 82 attaches to the ends of the top 64 and bottom 66 tubes in the conventional fashion through typical axle hardware. Additionally, the brake assembly is a conventional bicycle brake assembly having a front hand control lever 75, connecting cables, and brake calipers 76 (see FIG. 8) arranged to apply a braking force to the back wheel 80 in a typical manner.

Figure 5:
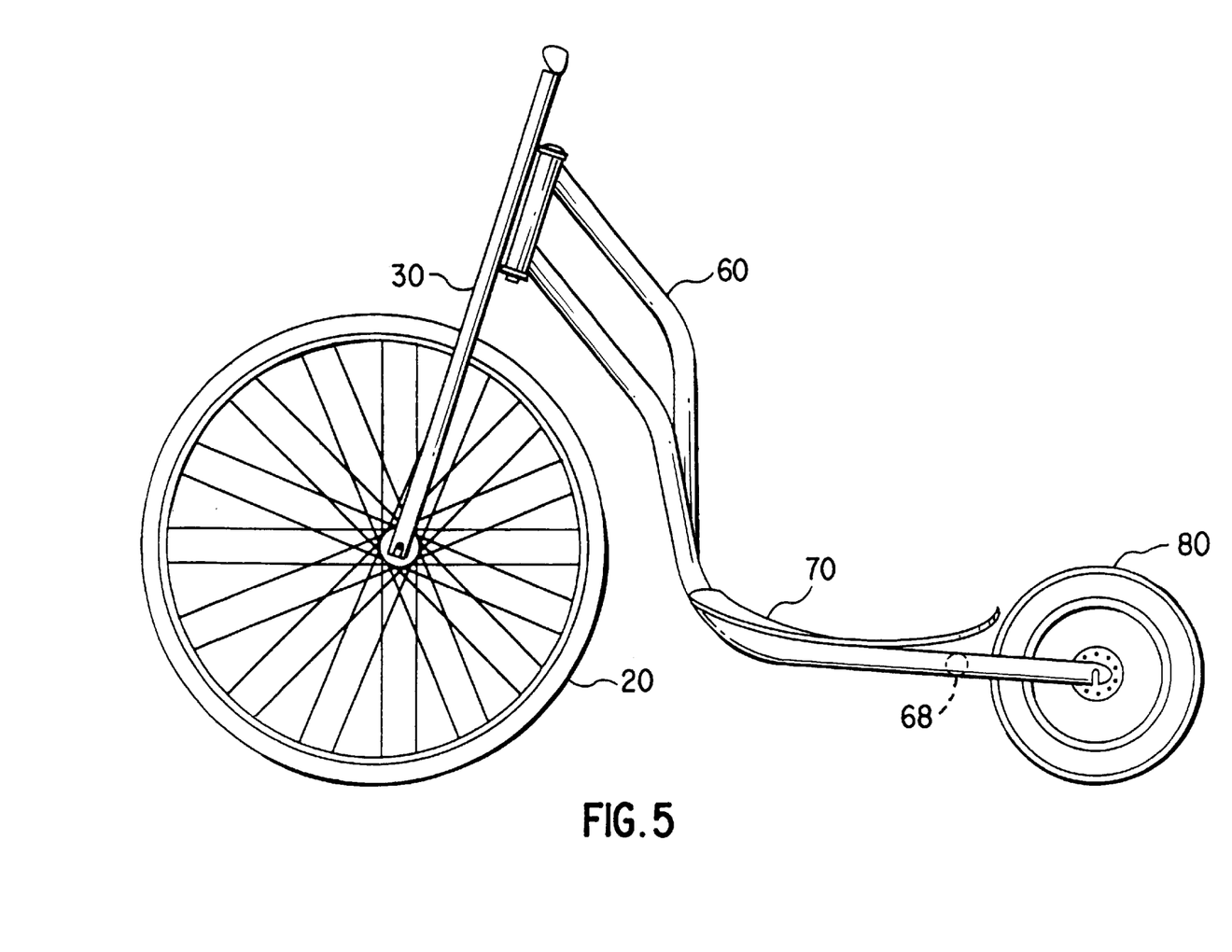
FIG. 5 is a side view of the first embodiment of the present invention showing the front wheel in a fourth rotational position.

The operation of the frequency-accelerated velocipede of the first embodiment of the present invention will now be explained with reference to FIGS. 2–5. First, a rider holds the handleforks 30 and places one foot on the deck 70. The rider then kicks off the ground with the other foot to propel the velocipede in a forward direction. Importantly, a tremendous mechanical advantage can be gained by synchronizing the kick strokes of the rider with the recovery cycle of the eccentric front wheel 20. As the hub of the front wheel begins its rebound up through its recovery cycle (FIG. 4), the rider can transfers his weight to the ground via his kicking foot. During the pushing stroke, the rider's weight is generally supported by the foot on the ground so that the frame 60, deck 70, and handleforks 30 can rebound upwards easily as the eccentric front wheel 20 continues through its rebound cycle (FIG. 5).

Figure 3:
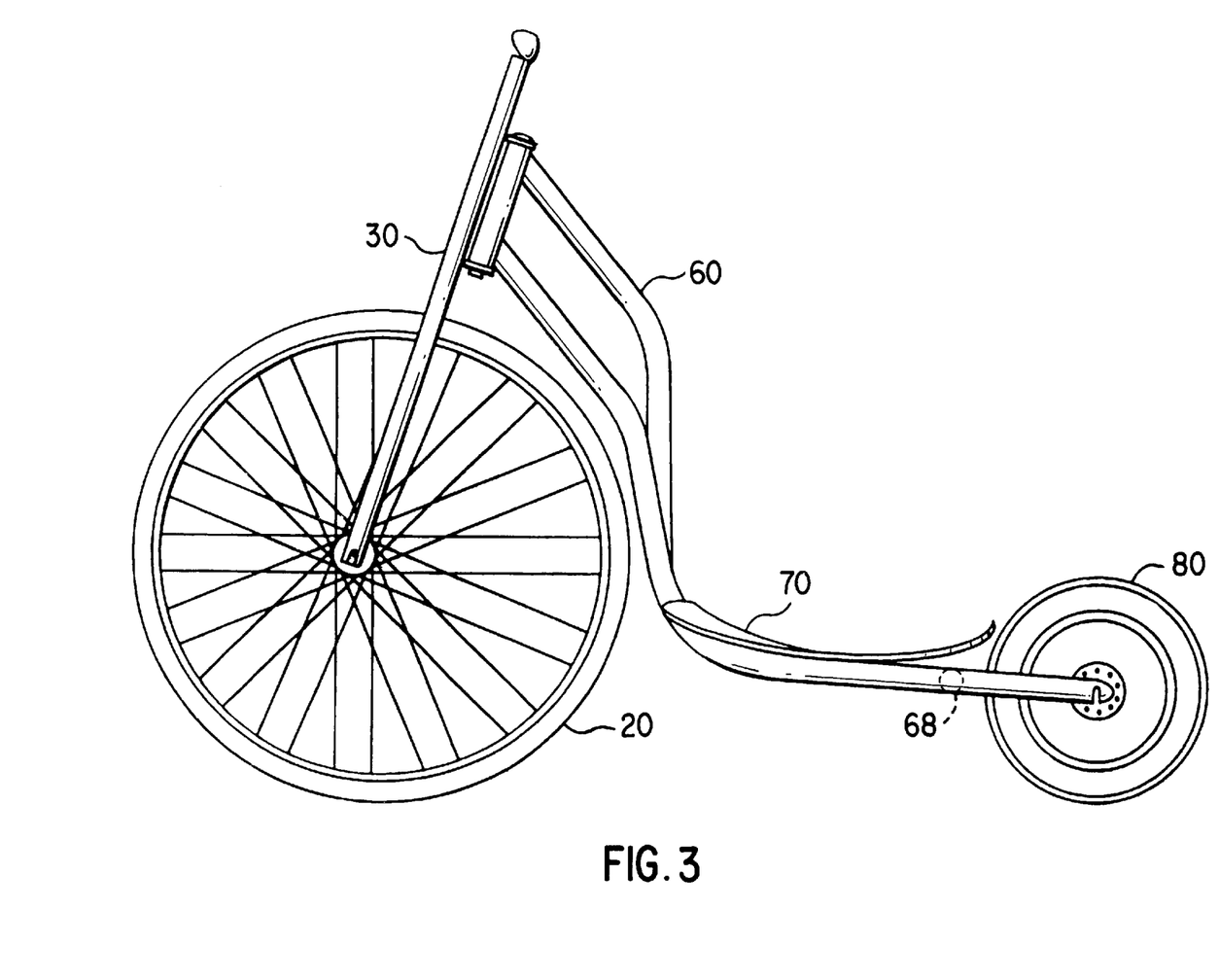
FIG. 3 is a side view of the first embodiment of the present invention showing the front wheel in a second rotational position.
Figure 4:
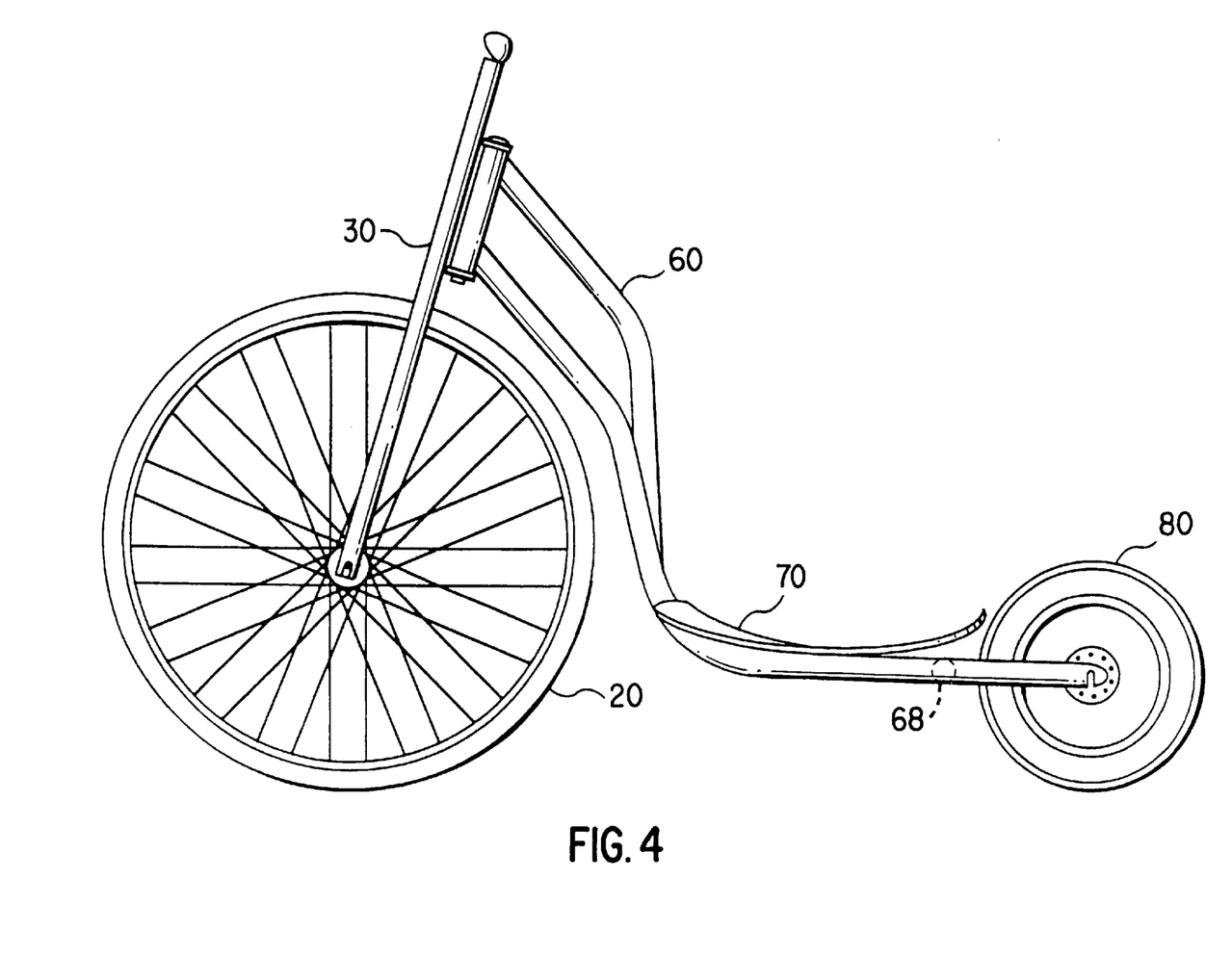
FIG. 4 is a side view of the first embodiment of the present invention showing the front wheel in a third rotational position.

When the rider finishes the pushing stroke and begins the follow-through of the kicking foot, his weight is transferred to the foot on the deck 70. If this happens just as the eccentric front wheel 20 begins to move downward through its power stroke (FIG. 2), the exaggerated re-weighting of the deck transfers the rider's downward motion to the front hub 28 to push the front hub 28 downward and accelerate the velocipede forward (FIG. 3). The rider then brings the kicking foot forward and begins another pushing stroke just as the eccentric front wheel 20 finishes its power stroke to start the process over again. In this way, the velocipede can be accelerated in both the power and recovery cycles of the front wheel.

After achieving sufficient speed, the rider places both feet on the deck 70. With the eccentric motion of the front wheel 20 in view, the rider begins to pump with legs, arms and torso to the rhythm of the eccentric front wheel. In particular, as the front hub 28 crosses the top dead center position for the wheel's power stroke (FIG. 2), the rider converts the potential energy of the raised velocipede to kinetic energy by pushing down on the deck 70 and handleforks 30. This accelerates the front hub 28 downward and rotates the eccentric front wheel 20 forward (FIG. 3).

As the front wheel crosses bottom dead center (FIG. 4), it moves into its recovery cycle so the rider flexes his knees and elbows to unweight the deck and handleforks. This allows the eccentric front wheel 20 to rotate upwards using less kinetic energy (FIG. 5). In other words, the kinetic energy of the forward moving velocipede and the flywheel action of the front wheel contribute to the rebound of the front wheel through its recovery cycle. By repeating this cycle, the rider finds the rhythm of the oscillating velocipede and synchronizes muscular inputs with the eccentric motion of the front wheel 20. Thus, the rider can propel and even accelerate the frequency-accelerated velocipede in the forward direction while both feet remain on the deck.

The directional control and brake action is performed just as in a conventional bicycle using the handleforks 30 and the brake assembly of the frequency-accelerated velocipede of the present invention.

As previously explained, the present invention provides a velocipede with a large, eccentric wheel mounted in the front to allow the rider immediate visual access to the driving wheel's eccentric movement. With this visual reference, the rider can quickly assimilate the full motion of the velocipede's eccentric oscillating movement. Additionally, the front-mounted eccentric wheel transfers the full motion of the eccentricity to the handlebars of the velocipede to provide the rider with a full-body aerobic workout. The present invention also provides a velocipede that incorporates a smaller back wheel that makes the device more compact and lighter.

Further, the present invention provides a velocipede with an improved frame geometry that can support a standing rider on a device having a large, eccentric front driving wheel and a smaller back wheel. The improved frame geometry connects a vertical head tube with a horizontal rear wheel axle, while primarily aligning the center of gravity of the rider over the driving wheel. This provides a large moment arm that the rider can take advantage of to more easily and efficiently propel the velocipede. Additionally, the improved frame geometry makes the device very sturdy by forming a closed toroid force loop that evenly distributes forces over the entire frame. This allows the device to be manufactured using lighter and less expensive materials.

The embodiments of the present invention described above relate to a velocipede having a metal frame, rim, and handleforks. However, the velocipede may be constructed using any rigid metal, alloy, composite, or plastic material or a combination of the above. Similarly, the deck could be constructed of any sufficiently rigid material and could have a variety of shapes. Additionally, while the shape of the top and bottom tubes in a preferred embodiment was described in detail, the frame could have a variety of shapes for connecting the head tube and the rear axle using only two tubes and a cross tube for support. Similarly, other design choices, such as the braking mechanism and headset assembly could easily be adapted. Furthermore, embodiments of the present invention may not include all of the features described above. For example, a braking mechanism or deck may not be required in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the following claims.

What is claimed is:

1. A rider-propelled vehicle comprising:
   a frame capable of supporting a rider;
   a front wheel that is eccentrically mounted to the frame through forks; and
   a rear wheel that is concentrically mounted to the frame using a rear axle,
   wherein the rider propels the vehicle using the cyclic motion of the eccentric front wheel, and
   the rear wheel rotates freely on the rear axle, with no driving mechanism,
   wherein the frame comprises:
      a head tube for interfacing with the forks;
      a top tube extending from the head tube to one side of an axle for the rear wheel;
      a bottom tube extending from a location on the head tube below the top tube to another side of the axle for the rear wheel; and
      a cross tube extending between the top tube and bottom tube in front of the rear wheel.

2. A frame for a rider-propelled vehicle of the type having a rear wheel and a front wheel connected to the frame using fork means, said frame comprising:
   a head tube for interfacing with the fork means so that the fork means and front wheel can be partially rotated for steering the vehicle;
   a top tube connected to the head tube and extending to one side of an axle for the rear wheel;
   a bottom tube connected to the head tube below the top tube, the bottom tube extending to another side of the axle for the rear wheel; and
   a cross tube extending between the top tube and bottom tube in front of the rear wheel,
   wherein the top tube and the bottom tube extend along side one another at the same height from the location for connecting the axle for the rear wheel to a predetermined location between the cross tube and a rear edge of the front wheel, for allowing connection with a deck capable of accommodating a rider.

3. The frame as defined in claim 2, wherein at least one of the front wheel and rear wheel is eccentrically-mounted.

4. The frame as defined in claim 2, wherein the rear wheel is concentrically-mounted and the front wheel is larger and eccentrically-mounted.

5. The frame as defined in claim 2, wherein portions of the top tube and bottom tube that extend along side one another are parallel with a ground level when the vehicle is standing.

6. The frame as defined in claim 2, wherein the deck is attached to the frame such that it does not support the frame.

* * * * *